(12) United States Patent
Gibson et al.

(10) Patent No.: US 8,626,714 B1
(45) Date of Patent: Jan. 7, 2014

(54) AUTOMATED SEPARATION OF CORPORATE AND PRIVATE DATA FOR BACKUP AND ARCHIVING

(75) Inventors: Douglas E. Gibson, Newton, MA (US); Keith Newstadt, West Newton, MA (US)

(73) Assignee: Symantec Corporation, Mountain View, CA (US)

( * ) Notice: Subject to any disclaimer, the term of this patent is extended or adjusted under 35 U.S.C. 154(b) by 87 days.

(21) Appl. No.: 13/227,151

(22) Filed: Sep. 7, 2011

(51) Int. Cl.
    *G06F 17/00* (2006.01)
(52) U.S. Cl.
    USPC ........... 707/640; 707/610; 707/688; 707/791; 707/802
(58) Field of Classification Search
    USPC .................................................. 707/600–899
    See application file for complete search history.

(56) References Cited

U.S. PATENT DOCUMENTS

| | | | |
|---|---|---|---|
| 6,654,755 B1* | 11/2003 | Vanska | 1/1 |
| 2004/0153445 A1 | 8/2004 | Horvitz et al. | |
| 2004/0186746 A1 | 9/2004 | Angst et al. | |
| 2006/0155863 A1* | 7/2006 | Schmidt | 709/229 |
| 2010/0217745 A1 | 8/2010 | Song et al. | |

OTHER PUBLICATIONS

PCT Notification of Transmittal of the International Search Report and the Written Opinion of the International Searching Authority, or the Declaration for International application No. PCT/US2012/053804; mailed Nov. 19, 2012; 11 pages.

* cited by examiner

*Primary Examiner* — Isaac M Woo
(74) *Attorney, Agent, or Firm* — Lowenstein Sandler LLP (57) ABSTRACT

A computing device categorizes data items as a corporate data items when a first criterion is satisfied and as personal data items when a second criterion is satisfied. The computing device provides identified corporate data items to a first backup system that stores the corporate data items to a corporate data store. The computing device further provides identified personal data items to a second backup system that stores the personal data items to a personal data store.

18 Claims, 8 Drawing Sheets

AUTOMATED SEPARATION OF CORPORATE AND PRIVATE DATA FOR BACKUP AND ARCHIVING

FIELD OF THE INVENTION

Embodiments of the invention relate to the field of data backup and archival, and more particularly, to separating private and corporate data for backup and archival purposes.

BACKGROUND OF THE INVENTION

It is common for corporate employees to use corporate resources (e.g., corporate email systems, corporate computers, corporate phones, etc.) for personal uses. Such mixed use of corporate resources for both corporate purposes and personal purposes introduces a number of problems with regards to the generation of backups and archives.

Mixed use of corporate resources causes the resources to include mixed personal and corporate data. Conventional backup and archival systems are not able to distinguish between the corporate and personal data. Accordingly, conventional backup systems simply backup all personal data along with the corporate data. This increases an amount of storage space that is used by the backup and archive systems. Additionally, there may be legal ramifications of the corporation backing up the users' personal data. Employees may also be uncomfortable with having their personal data backed up by the corporation. Moreover, when an employee leaves the corporation, the employee loses access to their personal data that has been archived or backed up by the corporation. Finally, employees who attempt to perform personal backups of their personal data that is on the corporate resources may inadvertently copy sensitive corporate data into the employee's personal backup.

SUMMARY OF THE INVENTION

In one embodiment, a computing device categorizes a plurality of data items, wherein each data item is categorized as a corporate data item when one or more first criteria are satisfied and as a personal data item when one or more second criteria are satisfied. The computing device provides the plurality of corporate data items to a first backup system that stores the corporate data items to a corporate data store. The computing device provides the plurality of personal data items to a second backup system that stores the personal data items to a personal data store.

In one embodiment, categorizing a data item comprises assigning a rating to the data item indicating a likelihood that the data item is a corporate data item, providing the data item to the first backup system if the rating is within a first rating range, and providing the data item to the second backup system if the rating is within a second rating range. In one embodiment, the categorizing is performed using a data loss prevention (DLP) system. For each data item, the DLP system applies at least one of indexed document matching, exact data matching, described content matching or vector machine learning to determine whether the data item contains sensitive information, wherein the data item is categorized as a corporate data item if the data item contains sensitive information.

In one embodiment, the computing device receives a user designation of the second backup system and of authentication credentials to use for accessing the second backup system. In one embodiment, the computing device scans previously backed up or archived data in the corporate data store. The computing device then separates out personal data items from the previously backed up or archived data, stores the personal data items to the personal data store, and deletes the personal data items from the corporate data store.

In one embodiment, the computing device includes a file system filter driver that intercepts an attempt by the first backup system to access the plurality of data items. The file system filter driver filters out the personal data items from the plurality of data items so that only the corporate data items are accessible by the first backup system. In one embodiment, the computing device includes a file system filter driver that intercepts an attempt by the second backup system to access the plurality of data items. The file system filter driver filters out the corporate data items from the plurality of data items so that only the personal data items are accessible by the second backup system.

In one embodiment, a computer readable medium includes instructions that will cause a processor that executes the instructions to categorize a plurality of data items, wherein each data item is categorized as a corporate data item when one or more first criteria are satisfied and as a personal data item when one or more second criteria are satisfied. The instructions further cause the processor to perform a first operation to backup or archive the corporate data items onto a first data store. The instructions further cause the processor to perform a second operation to backup or archive the personal data items onto a second data store that is different from the first data store.

In one embodiment, a method comprises categorizing a plurality of data items by a computing device, wherein each data item is categorized as a corporate data item when one or more first criteria are satisfied and as a personal data item when one or more second criteria are satisfied. The method further comprises providing the plurality of corporate data items to a first backup system that stores the corporate data items to a corporate data store. The method further comprises providing the plurality of personal data items to a second backup system that stores the personal data items to a personal data store.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

A method and apparatus for performing automated, policy based control of backup and archiving of mixed corporate and personal data are described. The process of backing up data creates a second copy of the data. The process of archiving data moves data from a particular location (e.g., an email server) to a secondary location. The method and apparatus provide a mechanism for separating an employee's personal data, (e.g., messages, files, contacts, etc.) from corporate data (e.g., messages, files, contacts, etc.), and for storing the corporate data on a corporate data store and the personal data on an employee's personal data store.

Some embodiments of the present invention are described with reference to a backup system or backup client. It should be understood that as used herein, a backup system and backup client can perform both backup operations and archiving operations. Additionally, it should be understood that any embodiments described with reference to performing backup can equally be applied to performing archiving, and that any embodiments described with reference to performing archiving may be applied to performing backup.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "categorizing", "applying", "providing", "receiving", "separating," "storing", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Embodiments of the present invention automatically identify corporate data items and personal data items from a set of mixed data items. Corporate data items can then be provided to a corporate backup system, while personal data items can be provided to a user designated personal backup system. This may reduce an amount of disk storage that is used for backup or archiving purposes by the corporate system. Additionally, this enables corporate employees to manage the backup of their personal data. The corporate employees may select a data service to use for their personal backup system, and may have access to this data after they separate from the corporation. Additionally, the corporate employees can prevent the corporation from accessing their personal backup after they leave the corporation simply by changing a password associated with their personal backup system. Therefore, embodiments of the present invention provide advantages over conventional backup and archiving techniques for both corporations and their employees.

Figure 1:
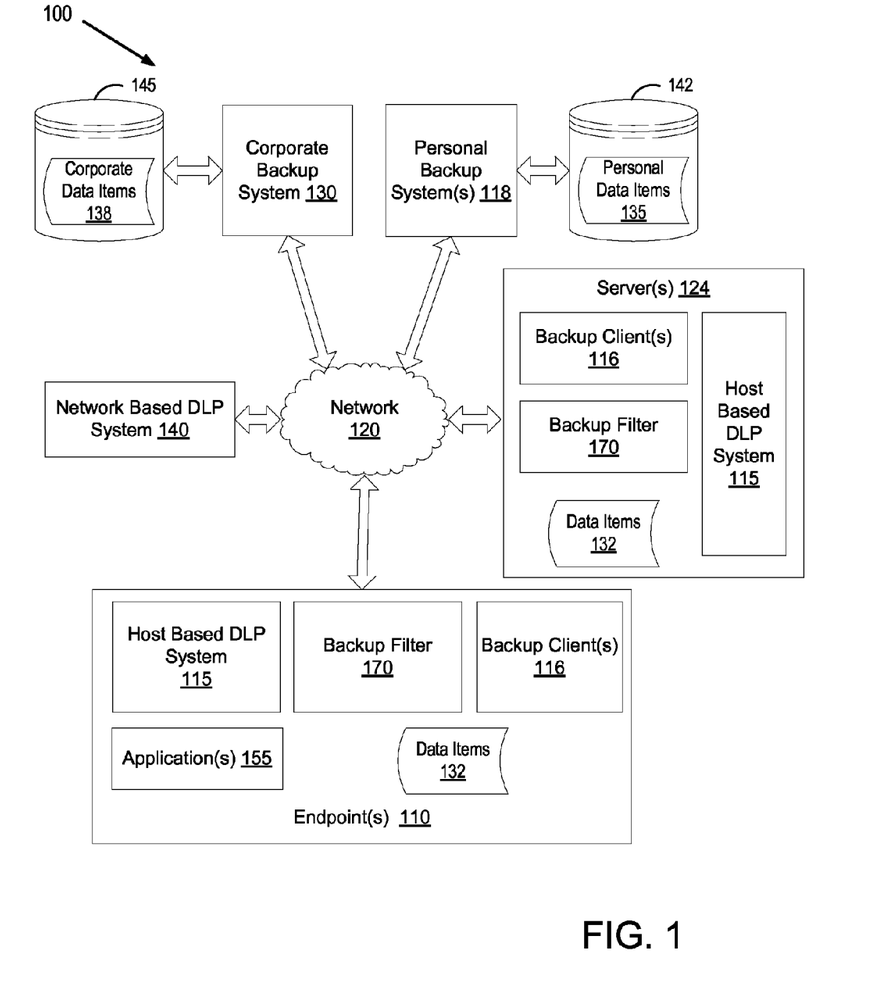
FIG. 1 illustrates an exemplary network architecture, in which embodiments of the present application may operate.

FIG. 1 illustrates an exemplary network architecture 100, in which embodiments of the present application may operate. The network architecture 100 may include endpoints 110 connected together and to enterprise servers 124 via a network 120. The network 120 may be a public network (e.g., the Internet), a private network (e.g., a local area network (LAN) or wide area network (WAN)), or a combination of a public network and private network. Network 120 may be the network of an enterprise (e.g., a corporation), and may also include such devices as network printers, switches, routers, gateways, firewalls, or any other devices having a network address. In one embodiment, the network architecture 100 further includes a network based data loss prevention (DLP) system 140, a corporate backup system 130, and one or more personal backup systems 118 connected to network 120. Note that the terms corporation and corporate refer to any business entity or enterprise and components controlled by or associated with a business entity or enterprise, respectively.

Endpoints 110 may be laptop computers, desktop computers, mobile phones, personal digital assistants (PDAs), notebook computers, tablet computers, or other endpoint computing devices connected to network 120. Alternatively, endpoints 110 may be virtual machines. Endpoints 110 include applications 155 that access, operate on and generate data items 132. Examples of applications include an email application (e.g., Microsoft Outlook, Mozilla Thunderbird, Apple Mail, etc.), a word processor (e.g., Microsoft Word, Open Office, etc.), a spreadsheet application (e.g., Excel), an instant messaging application (e.g., Yahoo Instant Messenger, Windows Live Messenger, ICQ, etc.), and so on. Examples of data items 132 include email messages, spreadsheet files, word processor files, presentation files, images, virtual business cards (or other electronic contact information), and so on.

In one embodiment, endpoints 110 include one or more backup clients 116. Backup clients 116 may facilitate and/or perform the backup and archiving of data items 132 to the corporate backup system 130 and/or the personal backup system 118. In one embodiment, endpoints 110 include a personal backup client for backing up data (or archiving data) to a personal backup system and a corporate backup client for backing up data (or archiving data) to a corporate backup system 130. Alternatively, endpoints 110 may include a single backup client that can backup data items 132 to both a personal backup system 118 and to a corporate backup system 130.

In one embodiment, the personal backup system 118 is an online backup service. The personal backup system 118 receives data items from a backup client 116 executing on an endpoint 110 or server 124, and stores the data items 132 in a data store 142. Examples of personal backup clients 116 include backup clients provided by Carbonite®, Backblaze®, SOS®, Dropbox®, Jungle Disk®, and Crashplan®, each of which backs up data to a specific personal backup system 118 (e.g., to Carbonite's data centers, to Backblaze's data centers, etc.). A user of the endpoint 110 (e.g., a corporate employee) may select a specific personal backup system that he or she prefers, and install a backup client 116 provided by the service provider of that personal backup system 118. Alternatively, the backup client may not be provided by the service provider of the personal backup system 118. Instead, the user may specify a personal backup system 118 in the backup client 116. The backup client 116 may include a list of supported personal backup systems. Alternatively, the user may input a location of the personal backup system (e.g., an internet protocol (IP) address and/or port number). The backup client 116 may then automatically backup data items 132 to the personal backup system 118. Users of different endpoints 110 may use different personal backup systems 118.

The corporate backup system 130 may be an online backup service. In one embodiment, the corporate backup system 130 is an enterprise class online backup system such as provided by Barracuda Networks®, IronMountain®, CoreVault®, Rackspace®, Amazon Simple Storage Service (S3)®, and so on. Alternatively, the corporate backup system 130 may be a corporate managed backup system that backs up data items to data stores 145 controlled by the corporation whose data is being protected. Examples of such corporate backup systems 130 include Symantec® Backup Exec®, Symantec NetBackup®, EMC Networker®, IBM Tivoli Storage Manager®, and so on.

Corporate backup system 130 may include one or more computing devices such as, for example, a desktop computer, laptop computer, server computer, etc. configured to perform designated tasks. Corporate backup system 130 may include one or more processing devices, memory, data stores, etc. Additionally, corporate backup system 130 may be a single machine or multiple machines, which may be arranged in a cluster. Different corporate backup systems 130 may use various combinations of backup clients 116, backup server software installed on server computers, network appliances, and so forth.

In one embodiment, backup clients 116 perform backup independent of any remote backup system. In such an embodiment, backup clients 116 may backup or archive data to a local drive (e.g., an external hard drive coupled to endpoint 110) or to a network drive (e.g., to a storage area network (SAN) or to a network attached storage (NAS)) without communicating with a personal backup system 118 or a corporate backup system 130. In another embodiment, backup is performed without use of backup clients. For example, corporate backup system 130 may access data items 132 on endpoints 110 without use of a backup client 116.

Enterprise servers 124 provide services to endpoints 110 on network 120. Examples of enterprise servers 124 include storage servers that provide network storage, email servers that handle incoming and outgoing email traffic, web servers, and so forth. Enterprise servers 124 may include one or more computing devices such as, for example, a desktop computer, laptop computer, server computer, etc. configured to perform designated tasks. Servers 124 may include one or more processing devices, memory, data stores, etc. Additionally, servers 124 may be a single machine or multiple machines, which may be arranged in a cluster. Servers 124 may include data items 132 that are to be backed up or archived. In one embodiment, servers 124 include backup clients 116 that facilitate or perform backup. Alternatively, backup may be performed without use of backup clients 116.

Data items 132 stored by servers 124 and data items stored by endpoints 110 may include a mixture of personal data items and corporate data items. The personal data items may include personal email messages, personal word processor files (e.g., resumes, recipes, letters), personal image files (e.g., personal photos), personal contacts, and so forth. Corporate data items may include corporate (e.g., work related) emails, work related spreadsheets, work related word processor files, presentations, and so forth. Moreover, data items 132 may include personal data items for multiple different individuals.

In one embodiment, endpoints 110 and/or servers 124 include a backup filter 170. Backup filter 116 analyzes data items to determine whether the data items resemble personal data items or corporate data items. Backup filter 170 then categorizes individual data items as personal data items or corporate data items. Backup filter 170 may additionally classify personal data items as personal data items belonging to a particular individual. For example, backup filter 116 may identify personal emails from a particular employee's mailbox as personal data items belonging to that employee.

Backup filter 170 provides corporate data items 138 to the corporate backup client and/or corporate backup system 130 for corporate backup, and provides personal data items 135 to personal backup clients and/or personal backup systems 118 for personal backup. In one embodiment, backup filter 170 controls which data items are visible to the different backup clients and/or backup systems. For example, backup filter 170 may block all visibility and/or access to personal data items 135 for a corporate backup client 116, and may block all visibility and/or access to corporate data items 138 for a personal backup client.

In one embodiment, backup clients 116 and backup systems 130, 118 are specified to the backup filter 170 as either personal backup clients/systems or corporate backup clients/systems. Alternatively, backup filter 170 may automatically designate particular backup clients/systems as personal backup clients/systems or corporate backup clients/systems. For example, a Symantec Backup Exec backup system is an enterprise class backup solution, and would not ordinarily be used by an individual for personal backup. Accordingly, Backup Exec may automatically be identified as a corporate backup system 130.

In one embodiment, backup filters 170 rely on data loss prevention (DLP) systems to identify data items as personal data items or corporate data items. For example, backup filters 170 may classify data items as corporate data items if a DLP system has identified the data items as including sensitive information such as confidential information. Accordingly, in one embodiment, endpoints and/or servers 124 include host based DLP systems 115. Each host based DLP system 115 protects an endpoint 110 or server 124 from data loss. In one embodiment, the backup of corporate data items to a personal backup system is classified as a data loss. Host based DLP system 115 may scan data items 132 for sensitive information. In one embodiment, when a host based DLP system 115 identifies sensitive information in a data item, the host based DLP system 115 notifies backup filter 170 that the data item contains sensitive information. Backup filter 170 may then classify the data item as a corporate data item. In another embodiment, the host based DLP system 115 makes a determination as to whether a data item is a personal data item or a corporate data item, and reports the determination to the backup filter 170. Host based DLP system 115 may also perform other data loss prevention, such as restricting access to sensitive data, tracking programs and/or users that access data items 132 that include sensitive information, and so on.

In one embodiment, backup filters 170 communicate with a network based DLP system 140 to help identify data items as corporate data items or personal data items. Network based DLP system 140 protects sensitive data that is at rest and/or in transit on network 120. Network based DLP system 140 may protect data that is present on network storage and/or data that is present on storage devices of individual endpoints 110. Network based DLP system 140 may also protect data that is included in email messages, in instant messages, that is uploaded to web sites, or that is otherwise to be transferred out of the network 120. The network based DLP system 140 in one embodiment includes a network appliance that is configured to enforce DLP policies on network 120.

Figure 2:
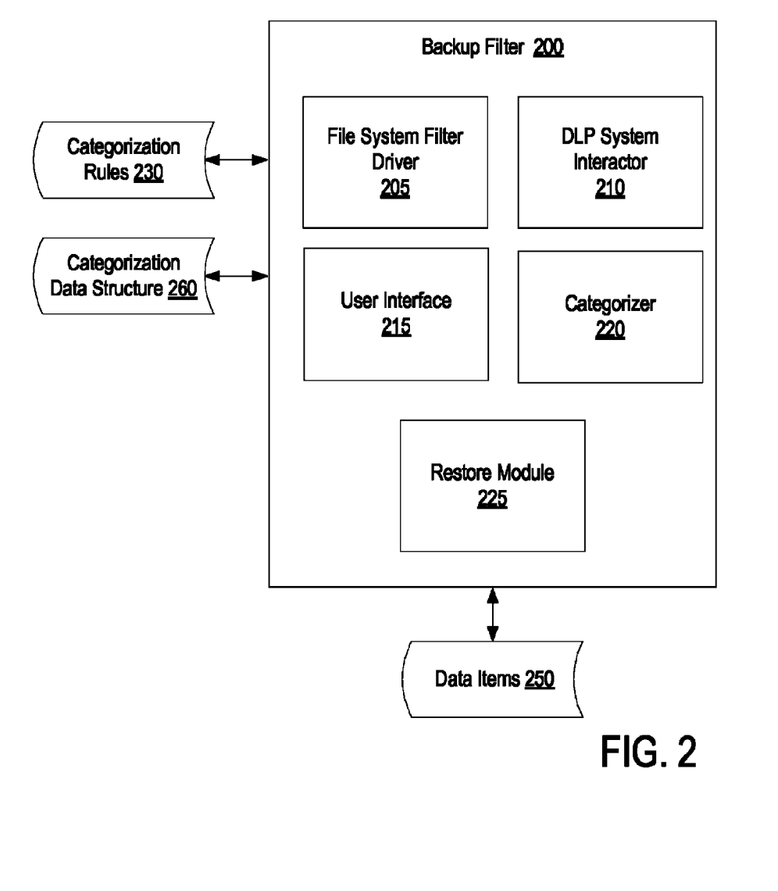
FIG. 2 is a block diagram of a backup agent, in accordance with one embodiment of the present invention.

FIG. 2 is a block diagram of a backup filter 200, in accordance with one embodiment of the present invention. In one embodiment, backup filter 200 corresponds to backup filter 170 of FIG. 1. In one embodiment, backup filter 200 includes a file system filter driver 205, a DLP system interactor 210, a user interface 215 and a categorizer 220. In other embodiments, the functionality of these modules may be further divided into additional modules, or the functionality of multiple modules may be combined into a single module.

Categorizer 220 classifies data items 250 as personal data items or corporate data items. In one embodiment, categorizer 220 uses categorization rules 230 to determine whether a data item should be categorized as a personal data item or a corporate data item. One example categorization rule may specify to categorize a data item as a corporate data item if it contains sensitive information (e.g., as determined by a DLP system). Another categorization rule may specify to categorize a data item as a corporate data item if it is a message that was directed to or received from an individual within a corporate domain (e.g., if it was an email to a workmate). Another categorization rule may specify to categorize a data item as a corporate data item if it is a message that was directed to or received from an individual in a corporate domain of a competitor or affiliate of a corporation that controls the endpoint hosting the backup filter 200. Other categorization rules may also be used.

In one embodiment, categorizer 220 assigns a rating to the data items 250. The rating indicates a likelihood that the data item is a corporate data item. In one embodiment, the rating is on a scale of 0 to 100, where 100 indicates that there is a 100% change that the data item is a corporate data item, and a 0 indicates that there is a 0% chance that the data item is a corporate data item (and thus a 100% chance that the data item is a personal data item). In one embodiment, a data item having a rating that falls within a first rating range is classified as a corporate data item and a data item having a rating that falls within a second rating range is classified as a personal data item. For example, on the scale of 0-100, a rating of 0-40 may be classified as a personal data item and a rating of 60-100 may be classified as a corporate data item. In another example, a rating of 0-40 may be classified as a personal data item and a rating of 41-100 may be classified as a corporate data item. Data items having a rating between the two rating ranges (e.g., having a rating of 41-59 in the first example) may be classified as both corporate data items and personal data items. Alternatively, such data items may be classified as unidentifiable data items.

In one embodiment, the rating for a data item is determined based on the categorization rules 230. For example, if a data item includes sensitive information, it may be assigned a maximum rating (e.g., 100). If the data item is to or from an individual within the corporate domain, and includes an attachment, a rating of 80 may be applied. If the data item is to or from an individual within the corporate domain, a rating of 70 may be applied, and so on. Categorizer 220 may determine which categorization rules are satisfied for a data item and then assign a rating to the data item based on the results.

In one embodiment, categorizer 220 tags data items after categorizing those data items. Tagging the data items may include adding metadata to the data items. The tag associated with a data item identifies that data item as a personal data item or as a corporate data item. Data items may also be tagged as unidentifiable data items, or as both corporate and personal data items.

In another embodiment, categorizer 220 generates a categorization data structure that includes an entry for each of the categorized data items. Each entry may identify the data item as a personal data item, a corporate data item, or both. The categorization data structure 260 may be a list, table, database, collection of key value pairs, or other data structure.

In one embodiment, categorizer 220 relies on a DLP system to categorize data items. In another embodiment, categorizer 220 categorizes a data item as a personal data item or a corporate data item based on whether the data item includes sensitive information. In such an embodiment, a DLP system indicates whether a data item includes sensitive information.

In one embodiment, categorizer 220 classifies data items on a periodic basis. For example, categorizer 220 may be configured to categorize data items daily, hourly, every 15 minutes, or on some other frequency. In another embodiment, categorizer 220 categorizes data items in response to a predefined event or events. For example, categorizer 220 may categorize data items as they are created and/or modified. In another example, categorizer 220 may categorize data items in response to detecting a data backup or archive operation.

Backup filter 200 may include a DLP system interactor 210 that exchanges communications with a network based DLP system and/or host based DLP system. DLP system interactor 210 may send a data item to a DLP system, or may send a pointer or other identifier that can be used to locate the data item to the DLP system. The DLP system may process the data item using a DLP policy designed to classify data items as corporate or personal data items, or using a DLP policy designed to identify whether the data item contains sensitive information. The DLP system interactor 210 may then receive a response from the DLP system indicating whether the data item is a corporate data item or a personal data item, or whether the data item contains sensitive information. In one embodiment, the response indicates a rating for the data item. The DLP system interactor 210 may then forward the received information on the data item to the categorizer 220.

In one embodiment, backup filter 200 includes a file system filter driver 205. Alternatively and/or in addition, backup filter 200 may include a disk filter driver (not shown). A file system filter driver is a driver that modifies the behavior of a file system. A file system filter driver can filter I/O requests for one or more file systems and/or file system volumes. The file system filter driver 205 can log, observe, modify and/or prevent I/O operations for file systems. In one embodiment, file system filter driver 205 is configured to prevent I/O operations by a corporate backup client or system that are directed to personal data items and prevent I/O operations by a personal backup client or system that are directed to corporate data items. File system filter driver 205 may intercept an I/O request, and determine whether a requestor is a corporate backup client/system or personal backup client/system. The file system filter driver 205 may then provide only corporate data items (e.g., filter out all personal data items) if the requestor is a corporate backup client or system, or provide only personal data items (e.g., filter out all corporate data items) if the requestor is a personal backup client or system.

In one embodiment, backup filter 200 operates in conjunction with off the shelf backup services, and the file system filter driver 205 selectively decides which data items 250 to provide to each backup service. In another embodiment, backup filter 200 is a component of a backup client, or is accessible via an application programming interface (API) by backup services and/or backup clients.

In one embodiment, backup filter 200 includes a restore module 225. If restoration of backed up (or archived) data is needed, restore module 225 may pull data from both the corporate backup system and the personal backup system to achieve a complete restoration of corporate and personal data to an endpoint or server. Restore module 225 may enable a user to search backed up or archived data via a single interface. Restore module 225 may present an integrated view of all archived data, as if the data had all been archived in a single data store. In one embodiment, restore module 225 identifies personal data items and corporate data items in the integrated view of the searched data items. The user may optionally choose to search, show or operate on only corporate data items or only personal data items.

In one embodiment, backup filter 200 includes a user interface 215. The user interface 215 may be a graphical user interface, command line user interface, or other user interface that enables a user to configure the backup filter 200. Users may, for example, adjust categorization rules and/or policies, specify backup services or clients as corporate or personal, control the format of backup data, adjust the location to which personal data will be backed up, input authentication information (e.g., for accessing a user's account with a personal backup system), control whether or not personal data items will be copied to the corporate backup system, and so on. In one embodiment, a user may additionally adjust actions that are performed by the backup filter 200 if it is unable to contact a specified personal backup system. For example, the backup filter 200 may be configured to cause the corporate backup system to copy the personal data items if the personal backup system is unavailable. Alternatively, the backup filter 200 may be configured to do nothing with regards to personal data items if the personal backup system is unavailable.

In one embodiment, backup filter 200 can be used to scan previously backed up or archived data. This data may have been backed up or archived to a corporate backup system. Backup filter 200 may identify personal data items that are included in the backed up or archived data. Backup filter may then copy or move the backed up or archived personal data items to a personal data system.

Figure 3:
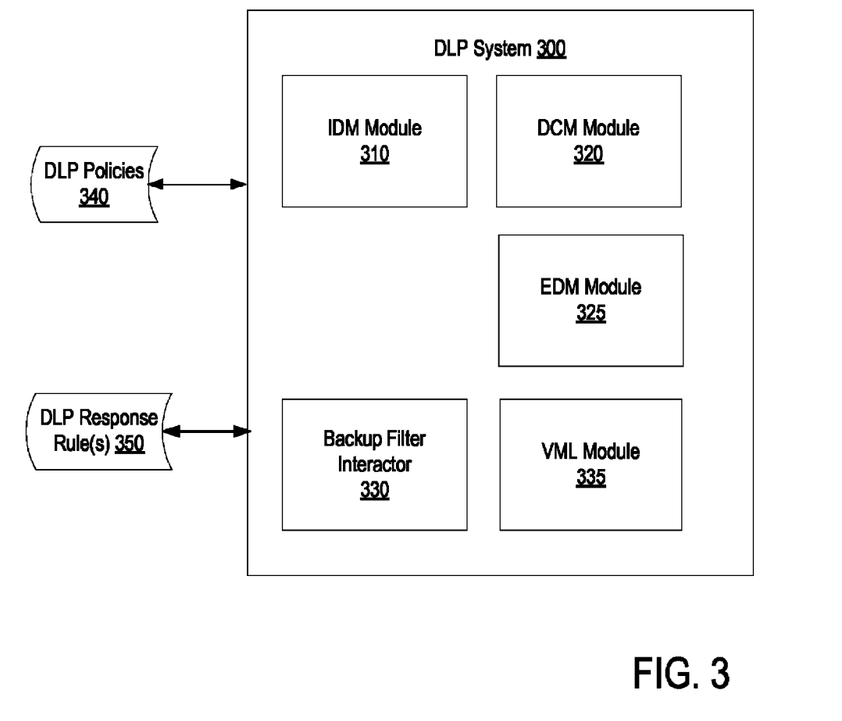
FIG. 3 is a block diagram of a data loss prevention system, in accordance with one embodiment of the present invention.

FIG. 3 is a block diagram of a data loss prevention system 300, in accordance with one embodiment of the present invention. The DLP system 300 may be a host based DLP system (e.g., host based DLP system 115 of FIG. 1) or a network based DLP system (e.g., network based DLP system 140 of FIG. 1). The DLP system 300 may monitor different data loss vectors, applications, data, etc. to detect attempts to move sensitive data and bait data off of an endpoint device and/or off of an enterprise's network. The DLP system 300 may also determine whether data items include sensitive data in response to a request from a backup filter. Additionally, the DLP system 300 may categorize data items as personal data items or corporate data items in response to a request from a backup filter. In one embodiment, the DLP system 300 includes an indexed document matching (IDM) module 310, a described content matching (DCM) module 320, an exact data matching (EDM) module 325, an incident report handler 315, a vector machine learning (VML) module 335 and a backup agent interactor 330.

The IDM module 310, DCM module 310, EDM module 355 and VML module 335 each implement a particular data loss prevention technique. The DLP system 300 implements one or more DLP policies 340, which indicate which DLP techniques to use. A DLP policy 340 is violated if one or more criteria included in the DLP policy 340 are satisfied. Examples of criteria include user status (e.g., whether a user has access privileges to a file), file location (e.g., whether a file is stored in a confidential database), file contents (e.g., whether a file includes sensitive information), time (e.g., whether an operation is requested during normal business hours), data loss vector, application attempting the operation, and so on.

The DLP policy 340 may include profiles that invoke one or more of the IDM module 310, DCM module 320, EDM module 325 or VML module 335. Each module may identify sensitive data. In one embodiment, the DLP policy 340 includes a DCM profile that invokes the described content matching (DCM) module 310. A DCM profile defines one or more key words and/or regular expressions to be searched for. For example, a profile may define a social security number using a regular expression. Using a DCM profile, DCM module 320 determines whether any information included in scanned data match the key words and/or regular expressions. If a match is found, then it may be determined that the data includes sensitive information.

In one embodiment, the DLP policy 340 includes an exact data matching (EDM) profile and/or a indexed document matching (IDM) profile that invoke EDM module 325 and/or IDM module 310, respectively. Exact data matching (EDM) may be used for protecting data that is typically in structured formats, such as database records. Indexed document matching (IDM) may be used to protect unstructured data, such as Microsoft® Word or PowerPoint® documents, or CAD drawings. For both EDM and IDM, sensitive data is first identified to the DLP system 300. DLP system 300 then fingerprints the sensitive data for precise, ongoing detection. In one embodiment, the fingerprinting process includes accessing and extracting text and data, normalizing it, and securing it using a nonreversible hash. When a file or other data is to be scanned, a fingerprint (e.g., hash) is generated of that file or contents of that file and compared to stored fingerprints. If a match is found, then the scanned file is identified as containing sensitive data.

In one embodiment, the DLP policy 340 includes a vector machine learning (VML) profile that invokes VML module 335. Vector machine learning may be used to protect sensitive unstructured data. For VML, a training data set including a set of sensitive data and a set of non-sensitive data is provided to the DLP system 300. The VML module 335 analyzes the training data set using vector machine learning to generate a classification model and a feature set, which are added to a VML profile along with the training data set. The classification model is a statistical model for data classification that includes a map of support vectors that represent boundary features. The feature set is a data structure such as a list or table that includes multiple features (e.g., words) extracted from the training data set. The VML module 225 processes the VML profile and input unclassified data to classify the data as sensitive or non-sensitive (or to classify the data as personal data or corporate data).

In one embodiment, DLP policies 340 include a DLP policy for classifying data as personal data or corporate data. The DLP policy may include an IDM profile, a DCM profile, an EDM profile and/or a VML profile. Additionally, the DLP policy may include additional categorization rules, as described with reference to FIG. 2. In one embodiment, the DLP system 300 assigns a categorization rating to a processed data item to indicate the likelihood that the data item is a corporate data item.

In one embodiment, DLP policies 140 include a DLP policy to determine whether the data item includes content indicative of personal data items. For example, messages that are signed, "love" or "sincerely," or that include specific phrases such as "happy birthday" may be more likely to be personal data items. The DLP policy for detecting personal data items may include an IDM profile, a DCM profile, an EDM profile and/or a VML profile.

Backup filter interactor 330 receives requests from a backup filter to process one or more data items. After the data items are processed, backup filter interactor 330 reports the results to the backup filter. The report may indicate whether a data item includes sensitive data, or may identify a data item as a personal data item or a corporate data item.

FIGS. 4-7 are flow diagrams of some embodiments of methods performed by a computing device. The methods are performed by processing logic that may comprise hardware (circuitry, dedicated logic, etc.), software (such as is run on a general purpose computer system or a dedicated machine), or a combination of both. In one embodiment, at least some operations of the methods are performed by a backup filter 200, as described in FIG. 2. In one embodiment, at least some operations of the methods are performed by a DLP system 300, as described in FIG. 3.

Figure 4:
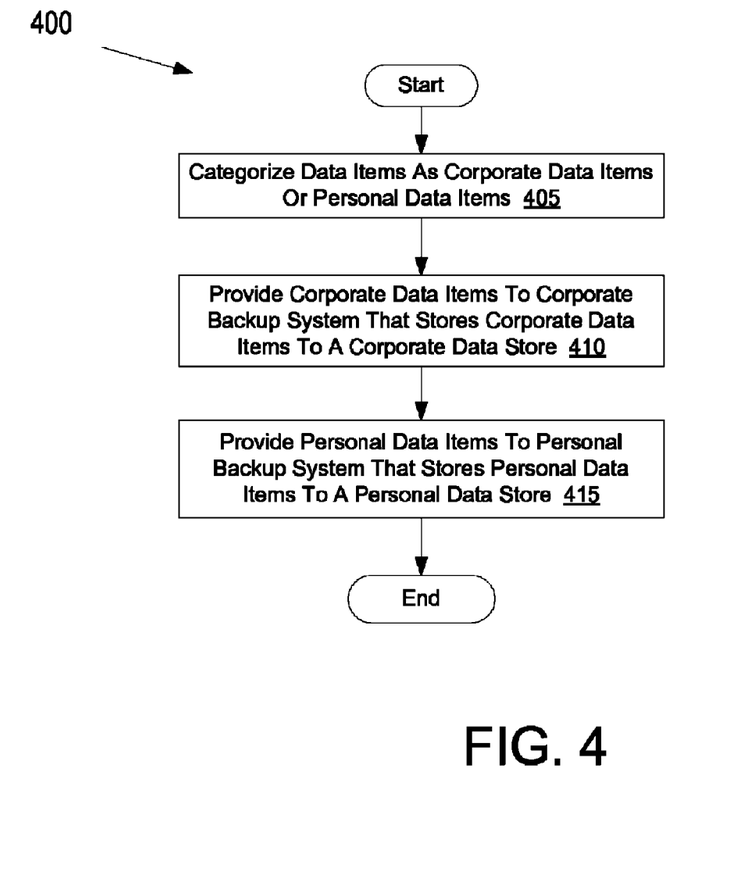
FIG. 4 is a flow diagram of one embodiment of a method for separating corporate data from personal data for backup and archiving.

FIG. 4 is a flow diagram of one embodiment of a method 400 for separating corporate data from personal data for backup and archiving. At block 405, processing logic categorizes data items as corporate data items or personal data items. Typically, some portion of the data items will be categorized as personal data items and another portion of the data items will be categorized as corporate data items.

At block 410, processing logic provides the corporate data items to a corporate backup system. The corporate backup system stores the provided corporate data items to a corporate data store. At block 415, processing logic provides the personal data items to a personal backup system. The personal backup system may have been specified by a user. The personal backup system stores the provided personal data items to a personal data store.

Figure 5:
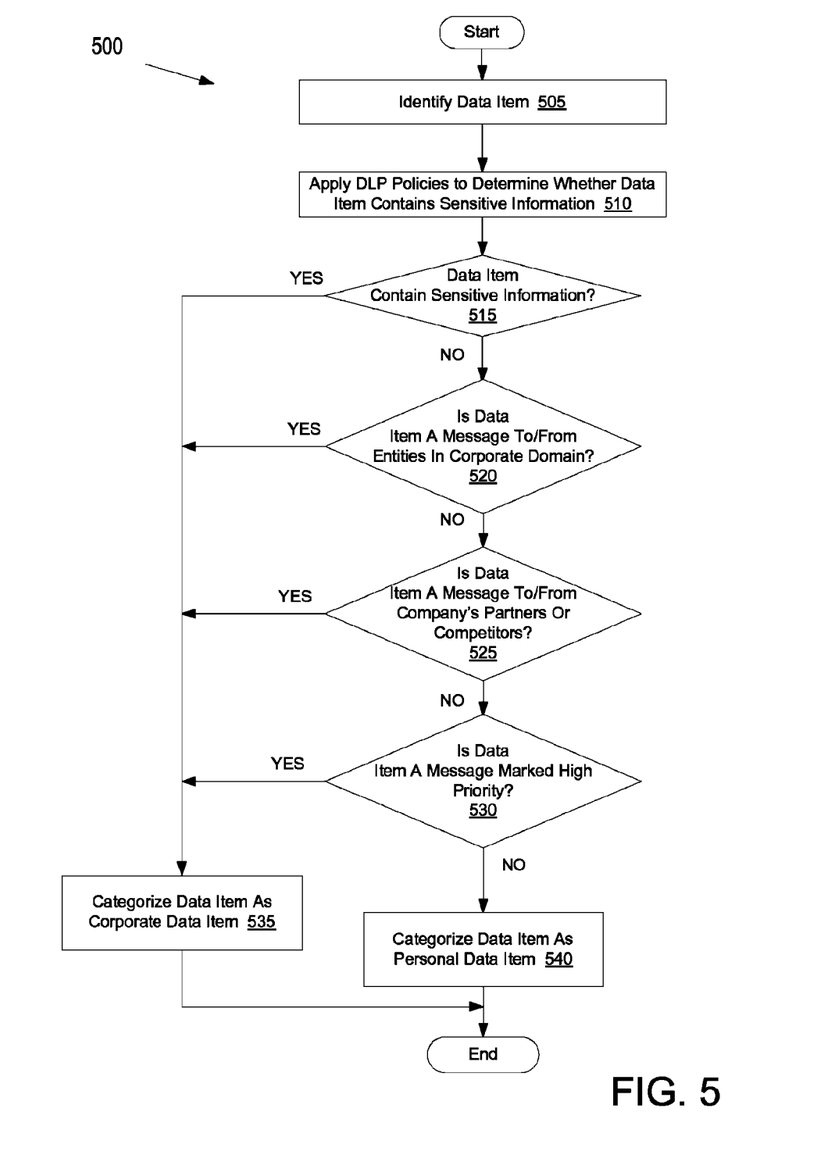
FIG. 5 is a flow diagram of one embodiment of a method for categorizing a data item as a corporate data item or a personal data item.

FIG. 5 is a flow diagram of one embodiment of a method 500 for categorizing a data item as a corporate data item or a personal data item. In one embodiment, method 500 is performed by block 405 of method 400. At block 505, processing logic identifies a data item. The data item may be an email message, an instant message, a file, a contact (e.g., of Microsoft Outlook), or some other data type. The data item may be stored in a network storage (e.g., in a storage space allotted to a user of the network storage by the user's employer) or in a local storage (e.g., of a personal computer assigned to the user by the employer). For email messages, the data item may be stored in a message server.

At block 510, processing logic applies a DLP policy (or multiple DLP policies) to determine whether the data item contains sensitive information. Applied DLP policies may include IDM profiles, DCM profiles, EDM profiles and/or VML profiles. At block 515, processing logic determines whether the data item contains sensitive information. If the data item does include sensitive information, the method continues to block 535, and the data item is categorized as a corporate data item. If the data item does not include sensitive information, the data item may still be a corporate data item. Accordingly, the method continues to block 520.

At block 520, processing logic determines whether the data item is a message (e.g., an email message or instant message) to or from an entity in a corporate domain. For example, processing logic determines whether the data item is between two employees of the corporation. If the data item is a message between employees of the corporation, it is likely that the message pertains to corporate business. Accordingly, if the data item is a message between employees of the corporation, the method continues to block 535, and the data item is classified as a corporate data item. In one embodiment, if only the sender or recipient of the message is an entity of the corporate domain, the method continues to block 525.

At block 525, processing logic determines whether the data item is a message to or from a partner or competitor of the corporation. For example, processing logic may determine whether the message is from a supplier, a client, a contractor, etc. of the company. If the message is to or from a corporate partner or competitor, the method proceeds to block 535, and the message is categorized as a corporate data item. Otherwise, the method continues to block 530.

At block 530, processing logic determines whether the message is marked as a high priority message. Processing logic may also determine whether the message includes a header that labels the message as urgent, or for immediate action, or the like. High priority messages are likely to be corporate data items. Accordingly, if the data item is a message marked high priority, the method continues to block 535, and the data item is classified as a corporate data item. Otherwise, the method continues to block 540, at which processing logic categorizes the data item as a personal data item.

Figure 6:
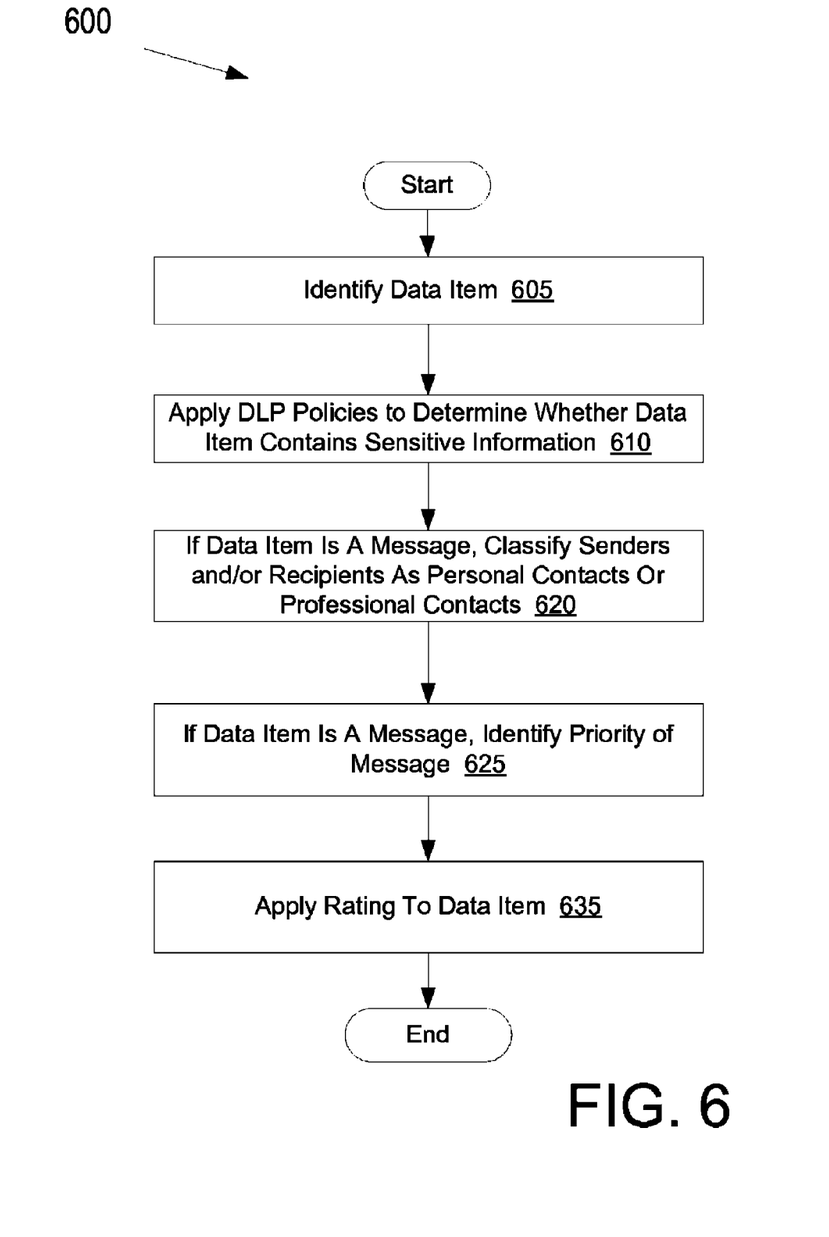
FIG. 6 is a flow diagram of another embodiment of a method for categorizing a data item as a corporate data item or a personal data item.

FIG. 6 is a flow diagram of another embodiment of a method 600 for categorizing a data item as a corporate data item or a personal data item. In one embodiment, method 600 is performed at bloc 405 of method 400. At block 605, processing logic identifies a data item. The data item may be identified during a scan of old emails or stored data items that are to be archived or backed up.

At block 610, processing logic applies a DLP policy (or multiple DLP policies) to determine whether the data item contains sensitive information.

At block 620, processing logic determines whether the data item is a message. If the data item is a message, processing logic classifies senders and/or recipients of the message as either personal contacts or professional contacts. At block

625, processing logic determines, if the data item was a message, whether the data item is marked as a high priority message.

At block 635, processing logic applies a rating to the data item based on the results of blocks 610-625. The applied rating may be a categorization rating that indicates a likelihood that the data item is a corporate data item. The higher the rating, the higher the likelihood that the data item is a corporate data item. For example, if the data item includes sensitive information (as identified by a DLP policy), then it can be determined with nearly 100% accuracy that the data item should be classified as a corporate data item. Data items that are assigned a rating in a first range may be categorized as corporate data items, while data items that are in a second range may be categorized as personal data items. Data items assigned an intermediate rating between the first range and the second range may not be clearly identified as either corporate data items or personal data items. Accordingly, such a data item may be classified as both a corporate and personal data item.

Figure 7:
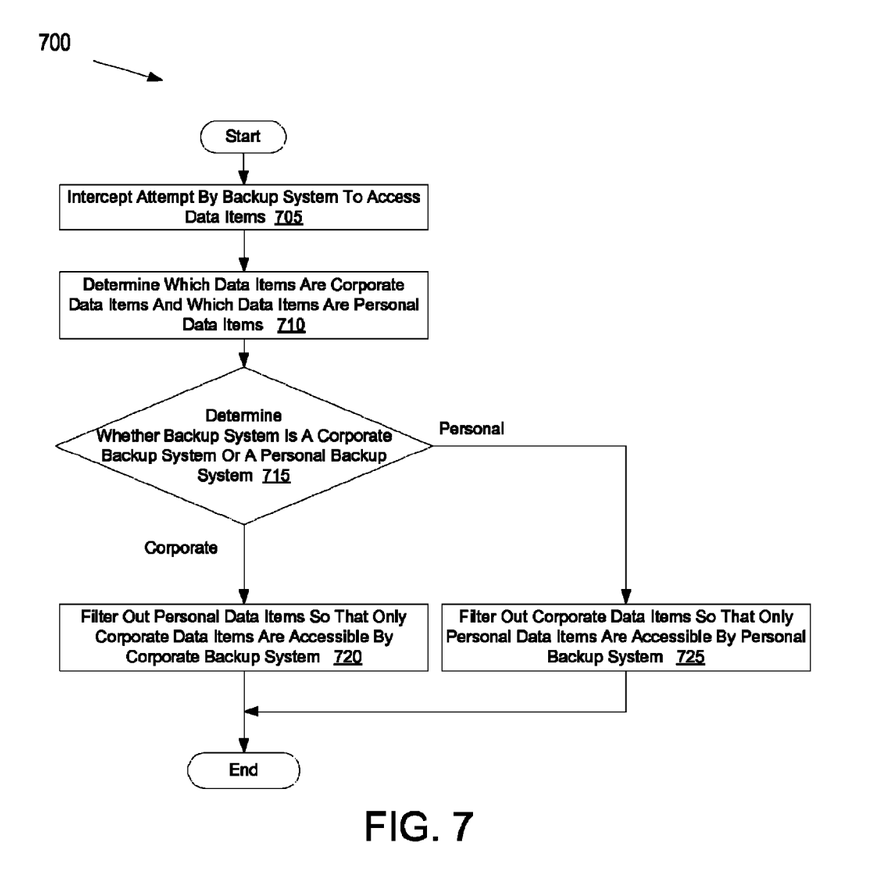
FIG. 7 is a flow diagram of one embodiment of a method for filtering out data items for backup and archiving tasks.

FIG. 7 is a flow diagram of one embodiment of a method 700 for filtering out data items for backup and archiving tasks. Method 700 may be performed by a backup filter in response to a backup client or backup system attempting to backup or archive data items. At block 705, processing logic intercepts an attempt by a backup system (or backup client) to access data items. In one embodiment, processing logic includes a file system filter driver that intercepts I/O requests from a backup system or backup client. The file system filter driver may block or allow I/O requests to data items based on a categorization of those data items. For example, the file system filter driver may block all I/O requests to personal data items by the corporate backup client or system.

At block 710, processing logic determines which data items are corporate data items and which data items are personal data items. At block 715, processing logic determines whether the backup system (or backup client) is a corporate backup system (or client) or a personal backup system (or client). If the backup system is s corporate backup system, the method continues to block 720. If the backup system is a personal backup system, the method proceeds to block 725.

At block 720, processing logic filters out personal data items so that only corporate data items are accessible by the corporate backup system (or client). The corporate backup system may accordingly backup all of the corporate data items without backing up any of the personal data items. At block 725, processing logic filters out corporate data items so that only personal data items are accessible by the personal backup system (or client). The personal backup system may accordingly backup all of the personal data items without backing up any of the corporate data items.

Figure 8:
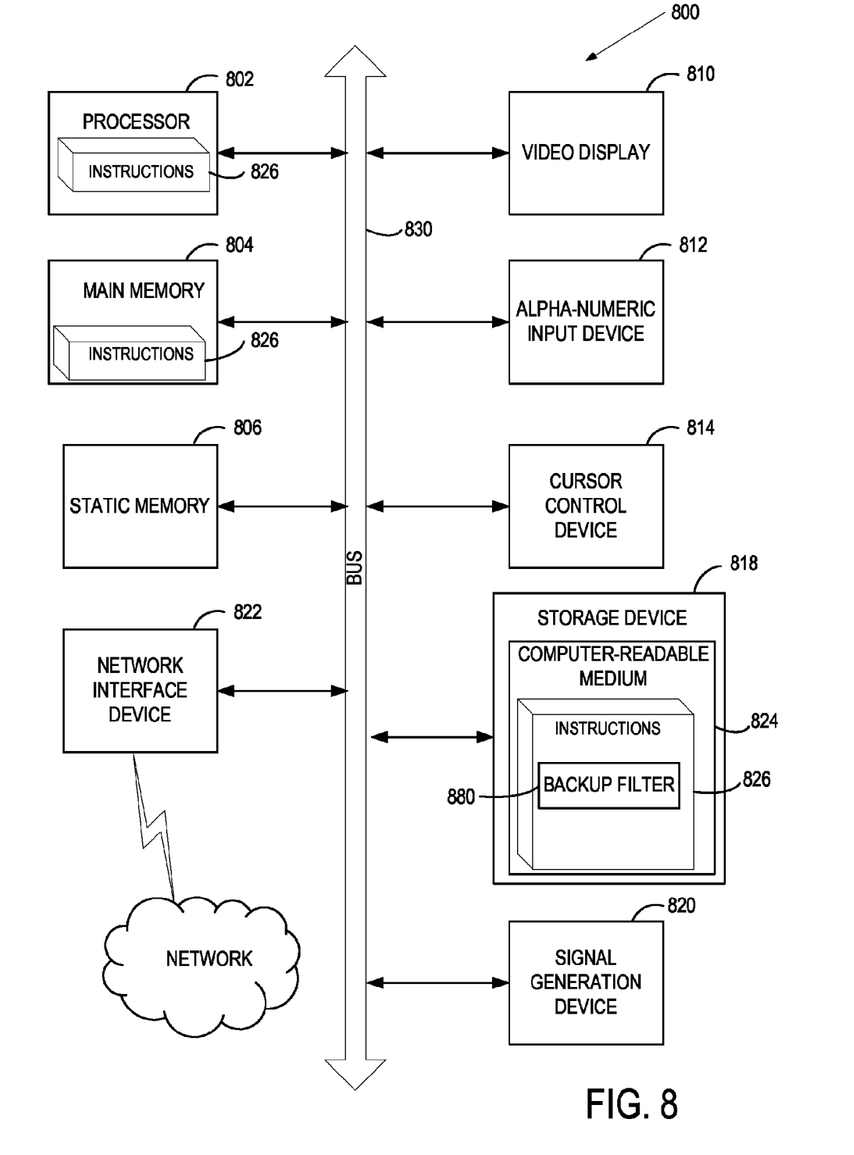
FIG. 8 is a block diagram of an exemplary computer system that may perform one or more of the operations described herein.

FIG. 8 illustrates a diagrammatic representation of a machine in the exemplary form of a computer system 800 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 800 includes a processing device (processor) 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a data storage device 818, which communicate with each other via a bus 830.

Processor 802 represents one or more general-purpose processing devices such as a microprocessor, central processing unit, or the like. More particularly, the processor 802 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 802 may also be one or more special-purpose processing devices such as an application specific integrated circuit (ASIC), a field programmable gate array (FPGA), a digital signal processor (DSP), network processor, or the like. The processor 802 is configured to execute instructions 826 for performing the operations and steps discussed herein.

The computer system 800 may further include a network interface device 822. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 820 (e.g., a speaker).

The data storage device 818 may include a computer-readable storage medium 824 on which is stored one or more sets of instructions 826 (e.g., software) embodying any one or more of the methodologies or functions described herein. The instructions 826 may also reside, completely or at least partially, within the main memory 804 and/or within the processor 802 during execution thereof by the computer system 800, the main memory 804 and the processor 802 also constituting computer-readable storage media. The instructions 826 may further be transmitted or received over a network 874 via the network interface device 822.

In one embodiment, the instructions 826 include instructions for a backup filter 880, such as backup filter 880 of FIG. 2, and/or a software library containing methods that call a backup filter 880. While the computer-readable storage medium 824 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

While the computer-readable storage medium may be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

It is to be understood that the above description is intended to be illustrative, and not restrictive. Many other embodiments will be apparent to those of skill in the art upon reading and understanding the above description.

What is claimed is:

1. A method comprising:
    categorizing a plurality of data items by a computing device using a data loss prevention (DLP) system, wherein categorizing a data item of the plurality of data items comprises applying at least one of indexed document matching, exact data matching, described content matching or vector machine learning by the DLP system to determine whether the data item contains sensitive corporate information, and wherein the data item is categorized as a corporate data item responsive to one or more first criteria being satisfied and as a personal data item responsive to one or more second criteria being satisfied;
    providing the plurality of corporate data items to a first backup system that stores the corporate data items to a corporate data store; and
    providing the plurality of personal data items to a second backup system that stores the personal data items to a personal data store.

2. The method of claim 1, further comprising:
    receiving a user designation of the second backup system and of authentication credentials to use for accessing the second backup system.

3. The method of claim 1, further comprising:
    scanning previously backed up or archived data in the corporate data store;
    separating out personal data items from the previously backed up or archived data;
    storing the personal data items to the personal data store; and
    deleting the personal data items from the corporate data store.

4. The method of claim 1, further comprising:
    intercepting, by a file system filter driver, an attempt by the first backup system to access the plurality of data items; and
    filtering out the personal data items from the plurality of data items so that only the corporate data items are accessible by the first backup system.

5. The method of claim 1, further comprising:
    intercepting, by a file system filter driver, an attempt by the second backup system to access the plurality of data items; and
    filtering out the corporate data items from the plurality of data items so that only the personal data items are accessible by the second backup system.

6. The method of claim 1, wherein categorizing a data item comprises:
    assigning a rating to the data item indicating a likelihood that the data item is a corporate data item;
    providing the data item to the first backup system if the rating is within a first rating range; and
    providing the data item to the second backup system if the rating is within a second rating range.

7. The method of claim 1, wherein the categorizing comprises determining whether the data item contains sensitive corporate information, wherein the data item is categorized as a corporate data item if the data item contains sensitive corporate information.

8. A computer readable storage medium including instructions that, when executed by a processing device, cause the processing device to perform a method comprising:
    categorizing a plurality of data items by the processing device using a data loss prevention (DLP) system, wherein categorizing a data item of the plurality of data items comprises applying at least one of indexed document matching, exact data matching, described content matching or vector machine learning by the DLP system to determine whether the data item contains sensitive corporate information, and wherein the data item is categorized as a corporate data item responsive to one or more first criteria being satisfied and as a personal data item responsive to one or more second criteria being satisfied;
    performing a first operation to backup or archive the corporate data items onto a first data store; and
    performing a second operation to backup or archive the personal data items onto a second data store that is different from the first data store.

9. The computer readable storage medium of claim 8, the method further comprising:
    receiving a user designation of the second data store and of authentication credentials to use for accessing the second data store.

10. The computer readable storage medium of claim 8, the method further comprising:
    scanning previously backed up or archived data in the first data store;
    separating out personal data items from the previously backed up or archived data;
    storing the personal data items to the second data store; and
    deleting the personal data items from the first data store.

11. The computer readable storage medium of claim 8, the method further comprising:
    intercepting, using a file system filter driver, an attempt by a backup system that backs up data to the first data store to access the plurality of data items; and
    filtering out the personal data items from the plurality of data items so that only the corporate data items are accessible by the backup system.

12. The computer readable storage medium of claim 8, the method further comprising:
    intercepting, using a file system filter driver, an attempt by a backup system that backs up data to the second data store to access the plurality of data items; and
    filtering out the corporate data items from the plurality of data items so that only the personal data items are accessible by the backup system.

13. The computer readable storage medium of claim 8, wherein categorizing a data item comprises:
    assigning a rating to the data item indicating a likelihood that the data item is a corporate data item;

providing the data item to the first data store if the rating is within a first rating range; and providing the data item to the second data store if the rating is within a second rating range.

14. An apparatus comprising:

a memory to store instructions for a backup filter; and a processing device, coupled to the memory, to execute the instructions, wherein the processing device is configured by the instructions to:

categorize a plurality of data items using a data loss prevention (DLP) system, wherein categorizing a data item of the plurality of data items comprises applying at least one of indexed document matching, exact data matching, described content matching or vector machine learning by the DLP system to determine whether the data item contains sensitive corporate information, and wherein the data item is categorized as a corporate data item responsive to one or more first criteria satisfied and as a personal data item responsive to one or more second criteria being satisfied;

provide the plurality of corporate data items to a first backup system that stores the corporate data items to a corporate data store; and     provide the plurality of personal data items to a second backup system that stores the personal data items to a personal data store.

15. The apparatus of claim 14, wherein the instructions further cause the processing device to:

scan previously backed up or archived data in the corporate data store;

separate out personal data items from the previously backed up or archived data;

store the personal data items to the personal data store; and     delete the personal data items from the corporate data store.

16. The apparatus of claim 14, wherein the instructions further cause the processing device to:

intercept, using a file system filter driver, an attempt by the first backup system to access the plurality of data items; and     filter out the personal data items from the plurality of data items so that only the corporate data items are accessible by the first backup system.

17. The apparatus of claim 14, wherein the instructions further cause the processing device to:

intercept, using a file system filter driver, an attempt by the second backup system to access the plurality of data items; and     filter out the corporate data items from the plurality of data items so that only the personal data items are accessible by the second backup system.

18. The apparatus of claim 14, wherein categorizing a data item comprises:

assigning a rating to the data item indicating a likelihood that the data item is a corporate data item;

providing the data item to the first backup system if the rating is within a first rating range; and     providing the data item to the second backup system if the rating is within a second rating range.

\* \* \* \* \*